United States Patent Office 2,984,268
Patented May 16, 1961

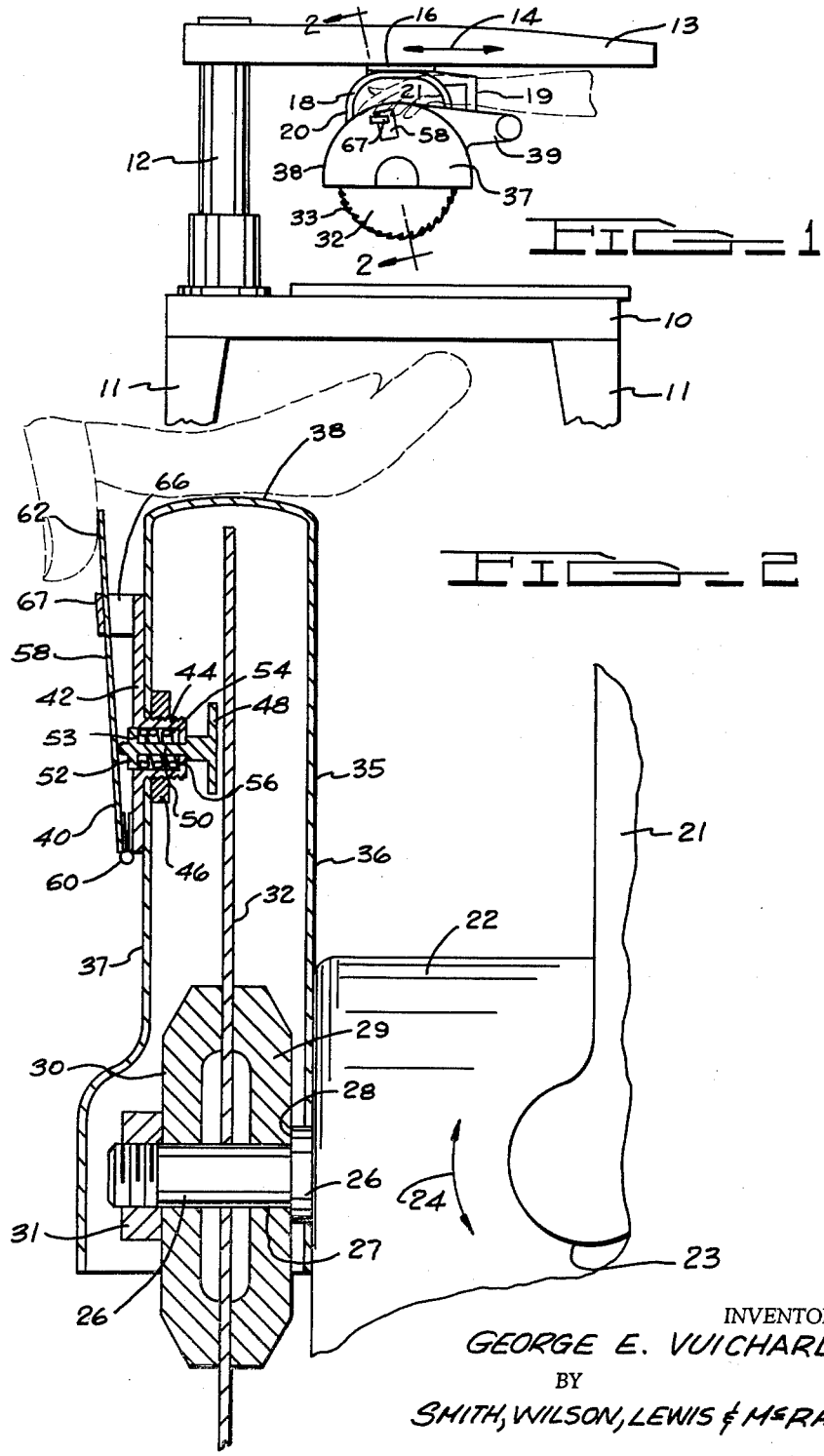

2,984,268

MANUALLY-ACTUATED SAW BRAKE

George E. Vuichard, 9223 Pinehurst, Detroit, Mich.

Filed July 7, 1958, Ser. No. 746,821

6 Claims. (Cl. 143—47)

This invention relates to power shop equipment having a motor driven cutting element, and particularly to a brake element for quickly halting rotation of the cutting element after de-energization of the cutting element motor. In this connection it is noted that when the brake element of the invention is employed the cutting element is halted within a very short time period, as for example two seconds, whereas without the brake element of the invention a time period of fifty seconds or more is required to halt rotation of the cutting element.

One object of the present invention is to provide a brake device which is actuable to very quickly halt rotation of a cutter element.

Another object of the invention is to provide a brake device which is of very simplified construction so as to permit manufacture of the device as a very low cost unit.

Another object of the invention is to provide a brake device which can be formed by a series of stock parts so as to further reduce manufacturing costs.

Another object of the invention is to provide a brake device which can be installed onto a cutter element housing with minimum alteration of the housing structure, thereby allowing inexperienced users to readily install the device.

Another object of the invention is to provide a brake device which can be installed at various different locations on a cutter element housing without materially reducing the operating efficiency of the device, thereby enabling the user to vary the location of the brake device in accordance with the location most to his liking, and further allowing the user to install the brake device onto the housing without fear that any errors in positioning the brake device will result in malfunctioning.

Another object of the invention is to provide a brake device which can be operated with a "one-handed" operation without requiring the user to move from his accustomed position adjacent the cutting machine.

Another object of the invention is to provide a brake device which is of compact construction so as to adapt the device for installation on a cutting element housing in a position where it will not interfere with proper operation of the cutting machine.

Another object of the invention is to provide a brake device which can be installed on most of the present day cutting machines, thereby enabling large numbers of users to enjoy the benefits of the invention.

Other objects of this invention will appear in the following description and appended claims, reference being had to the accompanying drawings forming a part of this specification wherein like reference characters designate corresponding parts in the several views.

In the drawings:

Figure 1 is an elevational view of a cutting machine having one embodiment of the invention installed thereon;

Fig. 2 is an enlarged sectional view taken substantially on line 2—2 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a power-operated cutting machine of the type manufactured by the De Walt Company of Lancaster, Pennsylvania, under their Model No. GW. This cutting machine comprises a generally horizontal frame structure 10 supported in spaced position above a floor (not shown) by means of four legs 11. Extending upwardly from frame structure 10 is a column structure 12 which mounts an arm 13 for 360° rotational movement around the column axis (i.e. in a horizontal plane).

Mounted for slidable movement on arm 13 in the arrow 14 directions is a roller head 16. Arrow 14 movement is accomplished by means of four rollers carried by head 16 and tracking in a guide structure carried by arm 13. Since the rollers and guide structure do not constitute part of the present invention they have been omitted from the drawings.

Depending from head 16 is a yoke member 18 which is equipped with a manually-graspable handle element 19. Two downwardly extending yoke arms 20 and 21 extend into spaced positions alongside of electric motor 22. Motor 22 is movably supported for pivotal movement around a horizontal axis by means of trunnion structure 23 located at the lower ends of yoke arms 20 and 21.

From the above description it will be noted that motor 22 is adapted for horizontal translatory movement in the arrow 14 direction as well as pivotal movement in the arrow 24 direction. Additional adjustment and movement of the motor is obtained by the rotary mounting of arm 13.

Motor 22 is provided with a driveshaft 26 having a reduced end portion 27 which defines a shoulder 28 for seating a conventional clamping member 29. Another clamping member 30 is seated on shaft section 27 by means of a nut 31. Clamping members 29 and 30 function to rigidly secure a generally circular cutting element 32 in fixed position relative to shaft 26. In the drawings cutting element 32 is shown as a sawblade having a series of peripheral teeth 33, but it will be appreciated that cutting element 32 could take the form of a sanding disk, grinding wheel, buffing wheel or other similar cutting element.

In order to guard the user against inadvertent injury from the cutting element 32 during cutting element rotation, there is provided a generally semi-circular housing member 35 having a pair of generally parallel side walls 36 and 37 connected with an end wall 38. A conventional dust spout structure is provided at 39. It will be understood that housing 35 is fixedly carried by the casing of motor 22 so as to be movable therewith.

During operation of the device a considerable time period, as for example fifty seconds, is required between de-energization of motor 22 and complete halting of rotation of cutter element 32. During this time period the user is of course reluctant to work in the space adjacent the cutter teeth 33, as for example for removing and inserting stock and adjusting the position of the cutting device to perform a new cutting operation. Accordingly, under the present invention there is provided a manually actuable mechanism 40 for quickly halting rotation of the cutter element after de-energization of motor 22. Mechanism 40 comprises a support structure in the form of a flat plate 42 having a tubular extension 44 projecting therefrom through an opening formed in housing side wall 37. A nut 46 is threaded onto extension 44 for immovably securing plate 42 onto the housing. Movably supported by tubular extension 44 is a brake assembly which comprises a disk-like brake element 48 and connected rod 50. Rod 50 carries an annular element 52 which defines a shoulder 53 engaged by one end of compression spring 54. The other end of compression spring 54 engages against the end wall 56 of extension 44, so that spring 54 is enabled to normally retain brake element 48 out of braking engagement with the side surface of cutting element 32.

In order to manually move brake element 48 into braking position against cutting element 32 there is provided a manually actuable lever 58 hingedly mounted on plate 42 by means of hinge 60. Lever 58 extends into close adjacency with housing end wall 38 to permit the user to actuate the lever with finger pressure. In this connection the user may conveniently actuate the brake by resting the palm of the hand on end wall 38 and pressing inwardly against lever surface 62 to move the lever clockwise (in Fig. 2) for forcing brake element 48 into braking engagement with cutter element 32.

As previously indicated, spring 54 is effective to urge brake element 48 out of its braking position. Spring element 54 also acts against lever 58, but excessive counterclockwise movement of lever 58 is prevented by arm 66 which extends integrally from support plate 42 into overlapment with the lever at 67. Arm 66 thus forms a stop device for limiting movement of lever 58.

It will be noted that the illustrated construction is formed as a low cost simplified mechanism having trouble-free, non-jamming operating characteristics. Also, installation of the brake structure is very conveniently effected by merely providing a single hole in housing side wall 37; as a result any householder can conveniently install the device.

The brake device, as shown in the drawings, directly contacts cutter element 32 in order to effect the braking operation. However, it will be appreciated that the brake device could also operate by engaging any surface rotating with cutter element 32. For example, clamping member 30 could be provided with an annular extension to be gripped by brake element 48.

The brake device in the illustrated embodiment is positioned with the upper end portion of lever 58 closely adjacent housing end wall 38 for allowing convenient manual operation. However, the brake device could be relocated onto another section of housing side wall 37 without materially reducing the brake operating efficiency. As a result, if the user should intentionally or otherwise install the brake device in some other location than that illustrated in the drawing no material decrease in braking efficiency would result.

Having thus described the invention, I claim:

1. The combination comprising a motor having a driveshaft; a cutting element carried by said driveshaft for conjoint rotation therewith; a housing partially surrounding said cutting element, said housing comprising an end wall located adjacent the periphery of the cutting element and a side wall extending from the end wall alongside one face of the cutting element; a support plate positioned flat-wise on the exterior surface of said housing side wall; an externally threaded tubular extension projecting from said plate through an opening in said housing side wall; a nut threaded onto said tubular extension for securing the plate in fixed position; a brake element positioned adjacent the end of said tubular extension; a rod element extending from said brake element axially through the tubular extension; means on said rod element forming a shoulder; compression spring means within said tubular extension and engaging the shoulder to normally urge the rod and brake element away from its braking position; and a manually actuable lever hingedly carried by said support plate and in pressure contact with said rod, whereby manual movement of said lever in one direction causes the brake element to be actuated against the opposition of the spring means.

2. The combination of claim 1 and further comprising an arm element integrally formed with said support plate, said arm element extending out of the plate plane and into close adjacency with a surface of the lever remote from the plate, whereby said arm element functions as a stop device for limiting movement of the lever under the influence of the spring means.

3. A cutting element brake comprising a substantially flat support plate; an externally threaded tubular extension projecting right-angularly from said plate; a nut carried on said tubular extension for mounting the support plate; a brake element located adjacent the end of said tubular extension; a rod extending from said brake element axially into the tubular extension; shoulder-forming means carried by said rod; a spring within the tubular extension and engaging the shoulder for urging the brake element out of braking position; a lever hingedly carried by said support plate and pressuringly engaging said rod; and stop means carried by said support plate for limiting movement of said lever under the influence of the spring.

4. A cutting element brake comprising a substantially flat support plate; an externally threaded tubular extension projecting right-angularly from said plate; an annular wall formed adjacent the end of said tubular extension to define a guide opening; a nut threaded on said tubular extension for mounting the support plate; a brake element located adjacent the end of said tubular extension; a rod guidingly extending from said brake element axially through the guide opening into the tubular extension; means carried by said rod and forming a shoulder; a spring within the tubular extension and engaged between said shoulder and annular wall for urging the brake element out of braking position; a lever hingedly carried by said support plate and pressuringly engaging said rod; and stop means carried by said support plate for limiting movement of said lever under the influence of the spring.

5. The combination comprising a table; a motor located above said table; a drive shaft for said motor; a rotary cutting element carried by said drive shaft; a housing partially surrounding said cutting element and permitting one edge portion of said cutting element to project therefrom; means mounting the motor and housing for travelling movement relative to the table; a support structure carried by the housing; a brake element movably carried by said support structure for quickly halting rotation of the cutting element after de-energization of the motor; a manual actuator carried by the support structure for operating said brake element; spring means normally holding the brake element out of braking position; and stop means limiting movement of the brake element by the spring means; said housing including an end wall adjacent the cutting element periphery and two substantially parallel side walls extending from the end wall along opposite faces of the cutting element; said manual actuator being positioned with its manually engageable portion closely adjacent the juncture between one of the housing side walls and the housing end wall, whereby the user may place the palm of his hand on the end wall and operate the actuator with finger pressure.

6. The combination comprising a table; a motor located above said table; a drive shaft for said motor; a rotary cutting element carried by said drive shaft; a housing partially surrounding said cutting element and permitting one edge portion of said cutting element to project therefrom; means mounting the motor and housing for travelling movement relative to the table; a support structure carried by the housing; a brake element movably carried by said support structure for quickly halting rotation of the cutting element after de-energization of the motor; a manual actuator carried by the support structure for operating said brake element; spring means normally holding the brake element out of braking position; and stop means limiting movement of the brake element by the spring means; said housing including an end wall adjacent the cutting element periphery and a side wall extending from the end wall along one face of the cutting element; said manual actuator comprising a lever pivotally connected with the support structure at a point remote from the housing end wall and extending to a point adjacent the side wall-end wall juncture; and said brake element comprising a thrust rod movable substantially at right angles to the housing side wall and engaging an intermediate portion of the lever; whereby the user may place the palm of his hand on the end wall and operate the lever with a manual squeezing pressure of his fingers thereon.

References Cited in the file of this patent

UNITED STATES PATENTS

| | | |
|---|---|---|
| 1,189,603 | Michener | July 4, 1916 |
| 1,811,066 | Tannewitz | June 23, 1931 |
| 2,440,322 | Barcroft et al. | Apr. 27, 1948 |
| 2,785,710 | Mowery | Mar. 19, 1957 |

FOREIGN PATENTS

| | | |
|---|---|---|
| 163,071 | Switzerland | Sept. 16, 1933 |